(12) United States Patent
Albright

(10) Patent No.: US 11,858,623 B2
(45) Date of Patent: Jan. 2, 2024

(54) AIRCRAFT FUEL TANK JOINTS AND METHODS OF ASSEMBLING THE SAME

(71) Applicant: The Boeing Company, Chicago, IL (US)

(72) Inventor: Justin Albright, La Mirada, CA (US)

(73) Assignee: The Boeing Company, Arlington, VA (US)

( * ) Notice: Subject to any disclaimer, the term of this patent is extended or adjusted under 35 U.S.C. 154(b) by 99 days.

(21) Appl. No.: 17/473,701

(22) Filed: Sep. 13, 2021

(65) Prior Publication Data

US 2023/0081133 A1    Mar. 16, 2023

(51) Int. Cl.
*B64C 3/34* (2006.01)
*B64D 37/32* (2006.01)
*B64C 3/26* (2006.01)
*B64C 3/18* (2006.01)

(52) U.S. Cl.
CPC .............. *B64C 3/34* (2013.01); *B64C 3/185* (2013.01); *B64C 3/26* (2013.01); *B64D 37/32* (2013.01)

(58) Field of Classification Search
CPC .................................... B64C 3/34; B64C 3/26
See application file for complete search history.

(56) References Cited

U.S. PATENT DOCUMENTS

| | | | |
|---|---|---|---|
| 7,837,148 B2 | 11/2010 | Kismarton et al. | |
| 7,887,009 B2 | 2/2011 | Keeler, Jr. et al. | |
| 8,993,097 B2 | 3/2015 | Kwon et al. | |
| 9,897,130 B2 | 2/2018 | Aston et al. | |
| 9,939,006 B2 | 4/2018 | Song et al. | |
| 10,556,665 B2 | 2/2020 | Best et al. | |
| 2009/0147429 A1 | 6/2009 | Martin Hernandez | |
| 2010/0107513 A1* | 5/2010 | Buchanan | B64C 3/18 52/84 |
| 2015/0041589 A1 | 2/2015 | Hasan et al. | |
| 2017/0050746 A1 | 2/2017 | Dobbin | |
| 2017/0152949 A1* | 6/2017 | Wiseman | B64C 3/00 |

* cited by examiner

*Primary Examiner* — Timothy D Collins
*Assistant Examiner* — Eric Acosta
(74) *Attorney, Agent, or Firm* — Kolitch Romano Dascenzo Gates LLC

(57) ABSTRACT

Aircraft fuel tank joints and related methods. The aircraft fuel tank joints comprise a first structural member comprising a first joint face, a second structural member comprising a second joint face that is spaced apart from the first joint face by a gap, a sealant dam compressed between the first and second joint faces and defining the gap, a first sealant zone on a first side of the sealant dam within the gap, and a second sealant zone on a second side of the sealant dam within the gap. The sealant dam and the first and second zones of sealant substantially fill, and form three independent seals within, the gap. The methods comprise substantially filling the gap with the sealant dam, the first zone of sealant, and the second zone of sealant, and compressing the sealant dam between the first and second faces to the compressed thickness.

20 Claims, 5 Drawing Sheets

AIRCRAFT FUEL TANK JOINTS AND METHODS OF ASSEMBLING THE SAME

FIELD

The present disclosure relates to aircraft fuel tank joints and methods of assembling the same.

BACKGROUND

Many aircraft include integral fuel tanks that are built into, and defined by, the airframe of the aircraft. Specifically, an integral fuel tank typically is formed by an enclosure in the airframe that is sealed with a series of fuel tank joints that mate the enclosure-defining components of the airframe. Most commonly, integral fuel tanks are formed within the wing box of either or both wings, where the fuel tank joints are formed between, for example, the spars and the upper and lower skins of the wing.

Conventionally, fuel tank joints in integral fuel tanks include a layer of sealant that extends between faying surfaces of the two joined components and several layers of sealant applied to the joint on either side of the sealant layer that are intended to form fillet seals. The process for forming these conventional fuel tank joints includes several manual steps. Not only is this process manually intensive, but typically requires operators to wear protective equipment while working within confined spaces (e.g., the interior of a wing box). Thus, a need exists for improved aircraft fuel tank joints and methods of assembling the same which may entail fewer manual steps for assembly and/or may be formed without fillet seals.

SUMMARY

Aircraft fuel tank joints and methods of assembling aircraft fuel tank joints are disclosed herein. The aircraft fuel tank joints comprise a first structural member comprising a first joint face and a second structural member comprising a second joint face that is spaced apart from the first joint face by a gap. The aircraft fuel tank joints further comprise a sealant dam and a plurality of sealant zones. The sealant dam extends substantially along the length of the aircraft fuel tank joint, is compressed between the first joint face and the second joint face, and has a compressed thickness that defines the gap. The plurality of sealant zones comprise a first zone of sealant within the gap on a first side of the sealant dam and a second zone of sealant within the gap on a second side of the sealant dam. The sealant dam isolates the first zone of sealant from the second zone of sealant and the sealant dam and the plurality of sealant zones substantially fill the gap. The sealant dam, the first zone of sealant, and the second zone of sealant define three independent seals within the gap.

The methods comprise substantially filling the gap with the sealant dam, the first zone of sealant, and the second zone of sealant, and compressing the sealant dam between the first joint face and the second joint face to the compressed thickness.

DESCRIPTION

Figure 1:
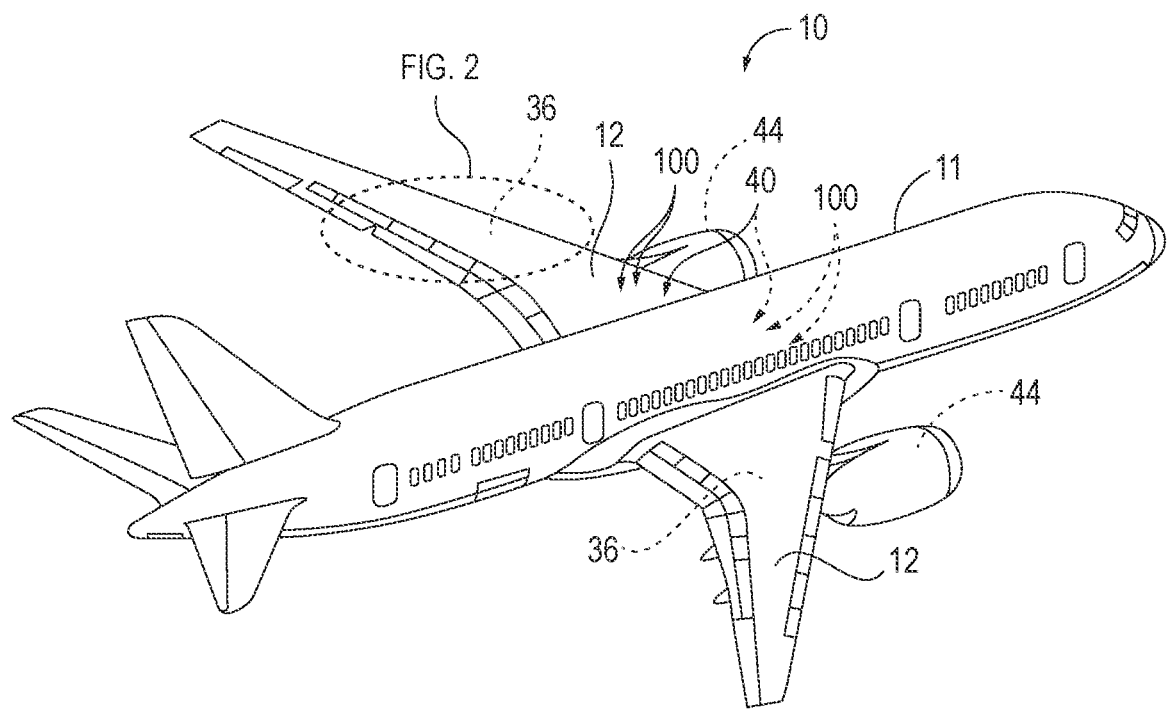
FIG. 1 is a schematic representation of an aircraft that comprises at least one aircraft fuel tank joint according to the present disclosure.

FIGS. 1-6 provide examples of aircraft fuel tank joints 100, wing boxes 36 comprising aircraft fuel tank joints 100, aircraft 10 having aircraft fuel tank joints 100, and methods 500 of assembling aircraft fuel tank joints 100 according to the present disclosure. Elements that serve a similar, or at least substantially similar, purpose are labelled with like numbers in each of FIGS. 1-6, and these elements may not be discussed herein with reference to each of FIGS. 1-6. Similarly, all elements may not be labelled in each of FIGS. 1-6, but reference numerals associated therewith may be utilized herein for consistency. Elements, components, and/or features that are discussed herein with reference to one or more of FIGS. 1-6 may be comprised in and/or utilized with any of FIGS. 1-6 without departing from the scope of the present disclosure.

Figure 3:
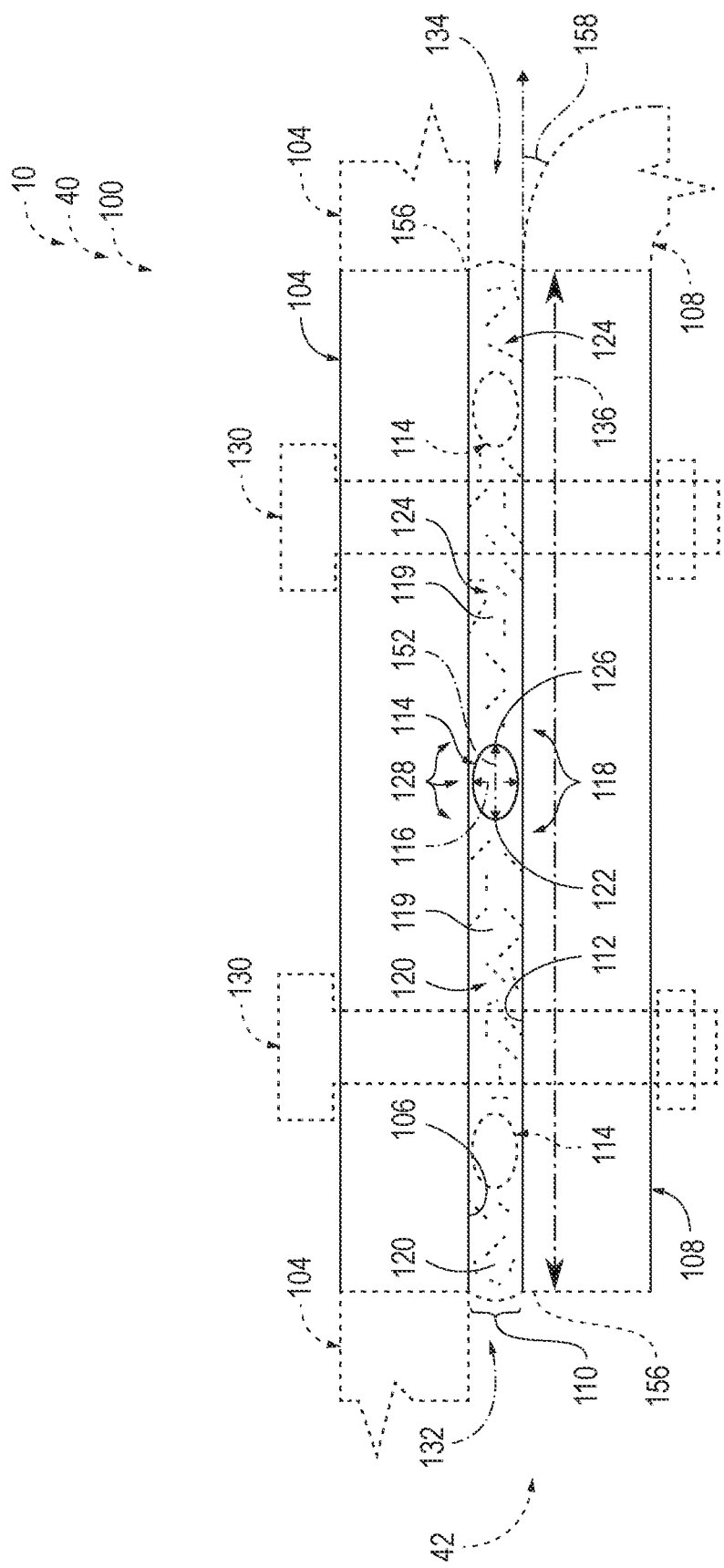
FIG. 3 is a schematic cross-sectional view representing aircraft fuel tank joints according to the present disclosure.
Figure 4:
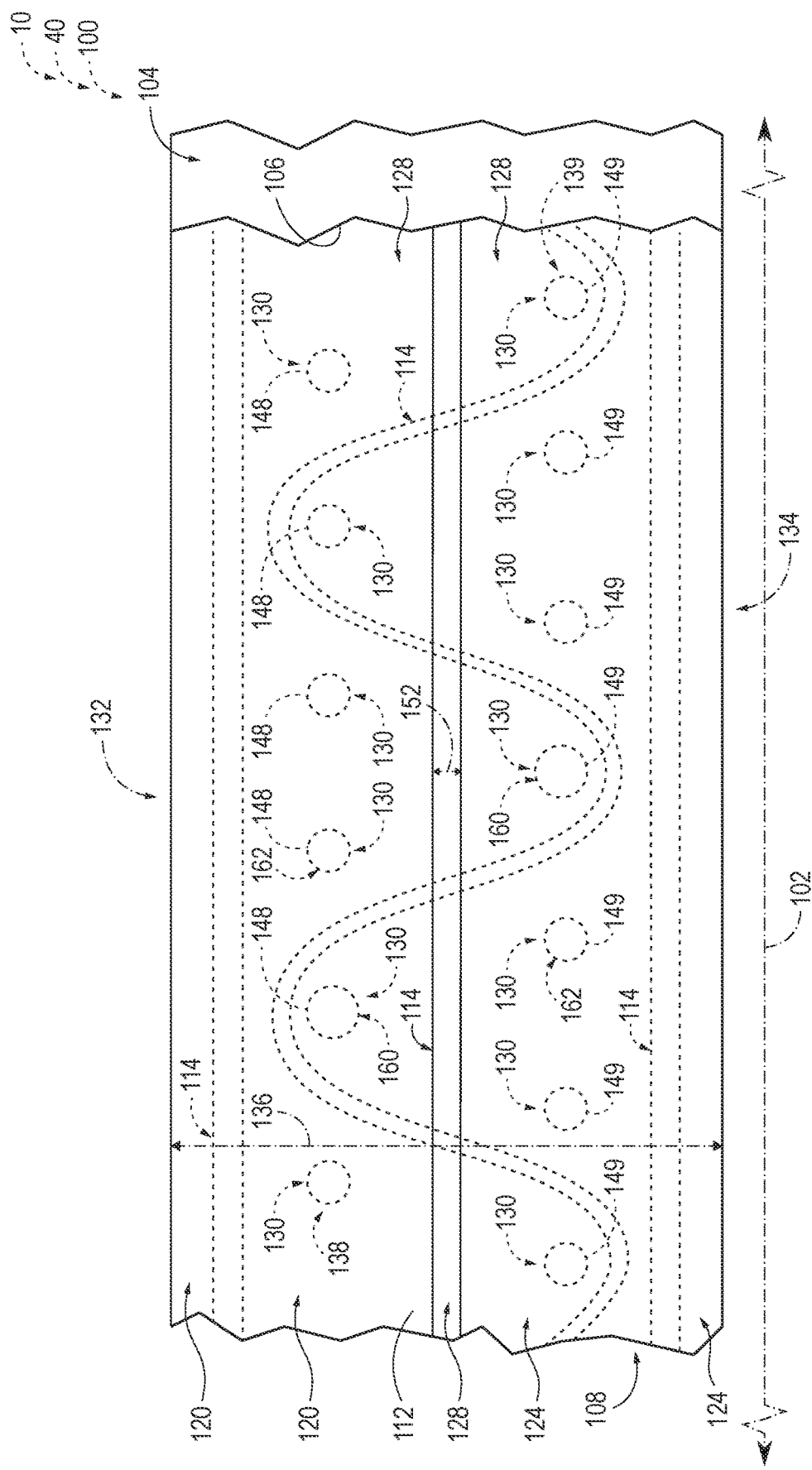
FIG. 4 is a schematic cutaway top-down view representing aircraft fuel tank joints according to the present disclosure.
Figure 6:
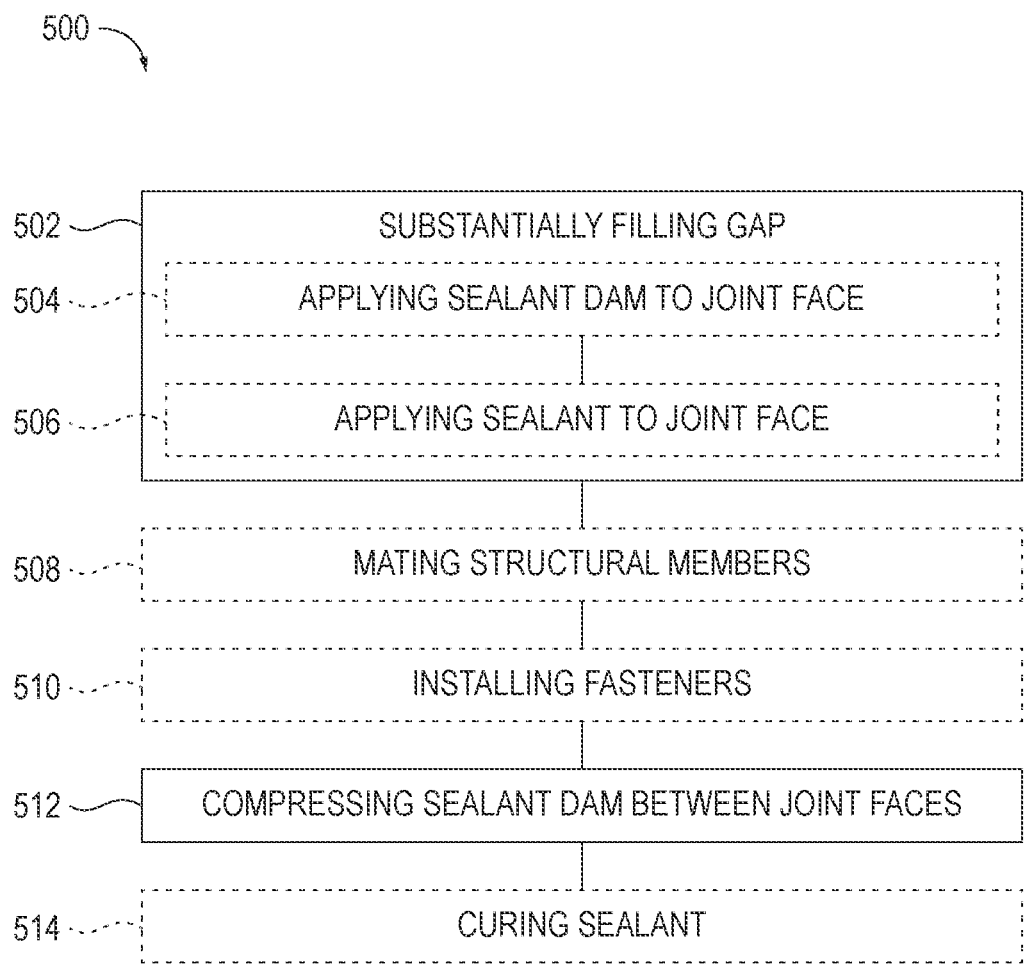
FIG. 6 is a flowchart schematically representing examples of methods of assembling an aircraft fuel tank joint according to the present disclosure.

Generally, in FIGS. 3, 4, and 6, elements that are likely to be comprised in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the present disclosure. Additionally, in schematic FIGS. 3 and 4, virtual features, such as dimensions, boundaries, etc., that may be defined by aircraft fuel tank joints according to the present disclosure are indicated in dash-dot lines, and these virtual features may or may not be optional to the illustrated embodiment.

Figure 5:
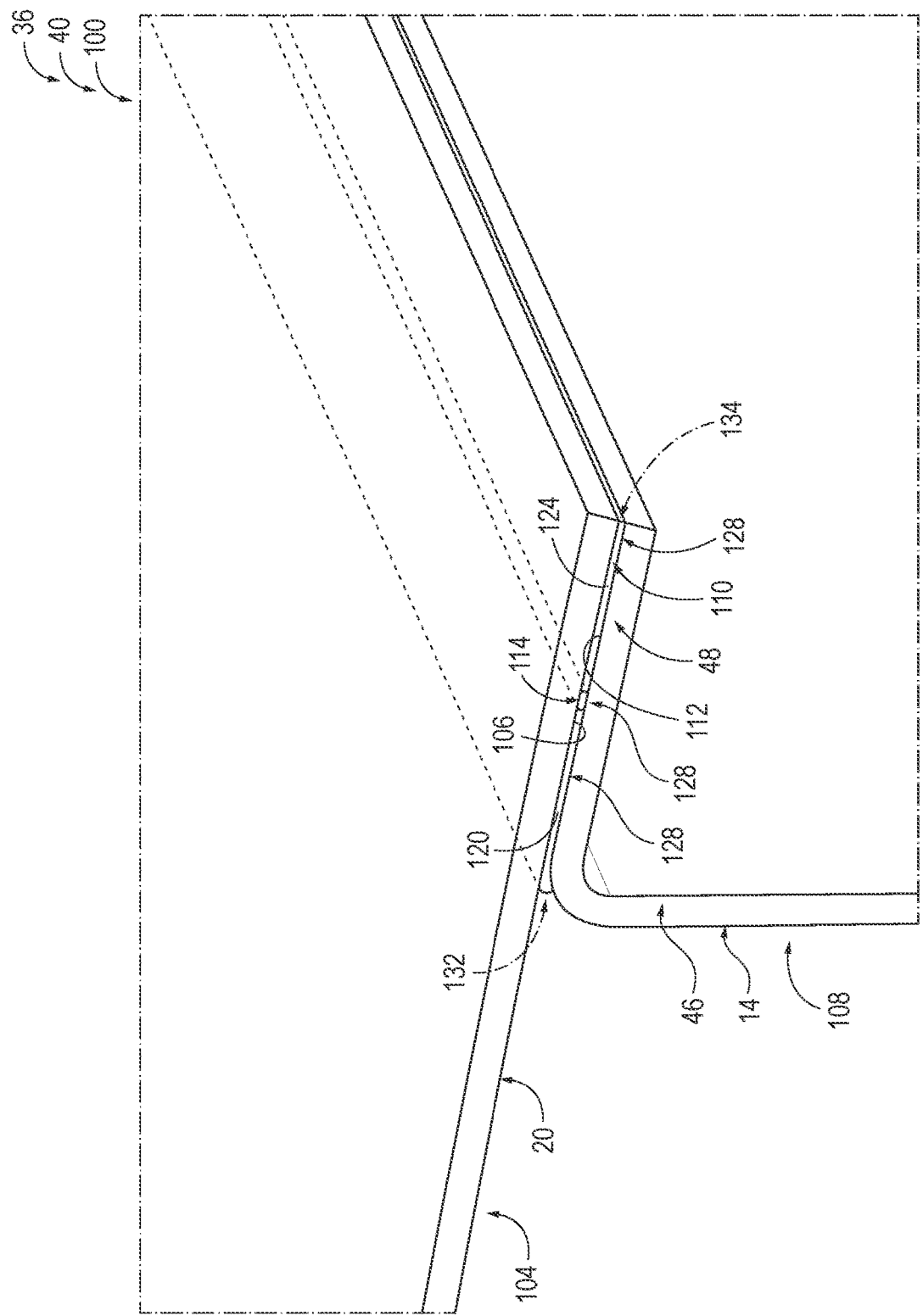
FIG. 5 is a partial isometric view showing a less schematic example of an aircraft fuel tank joint according to the present disclosure.

FIG. 1 is an illustration of an example of aircraft 10 that comprises at least one aircraft fuel tank joint 100, according to the present disclosure. Examples of aircraft fuel tank joints 100 are illustrated in FIGS. 3-5 and discussed in more detail herein with reference thereto. As shown in the example of FIG. 1, aircraft 10 typically comprises at least a fuselage 11, wings 12 that are supported by fuselage 11, and at least one integral aircraft fuel tank 40. Integral aircraft fuel tank 40 comprises at least one, and typically a plurality of, aircraft fuel tank joints 100. Aircraft fuel tank joints 100 are configured to enclose an internal fuel volume within integral aircraft fuel tank 40 to contain aircraft fuel within integral aircraft fuel tank 40. Each wing 12 comprises a wing box 36, and each wing box 36 may define and/or comprise a respective integral aircraft fuel tank 40. Wing boxes 36 additionally or alternatively may be referred to herein as aircraft wing boxes 36. Examples of wing boxes 36 according to the present disclosure are illustrated and discussed in more detail herein, with reference to FIG. 2. Aircraft 10 also may comprise at least one engine 44, and each engine 44 may be operatively attached to a respective wing 12. Aircraft fuel may be supplied from integral aircraft fuel tank 40 to a corresponding engine 44 during flight and/or taxiing operations.

Aircraft 10 may comprise any suitable type of aircraft, with examples comprising private aircraft, commercial aircraft, cargo aircraft, passenger aircraft, military aircraft, jetliners, wide-body aircraft, and/or narrow body aircraft. Aircraft 10 is configured to transport any suitable type of payload such as passengers, crew, cargo, and/or combinations thereof. While FIG. 1 shows an example in which aircraft 10 is a fixed wing aircraft, aircraft fuel tank joints 100 may be comprised in and/or utilized with any other suitable type of aircraft, such as rotor craft and/or helicopters, without departing from the scope of the present disclosure.

Figure 2:
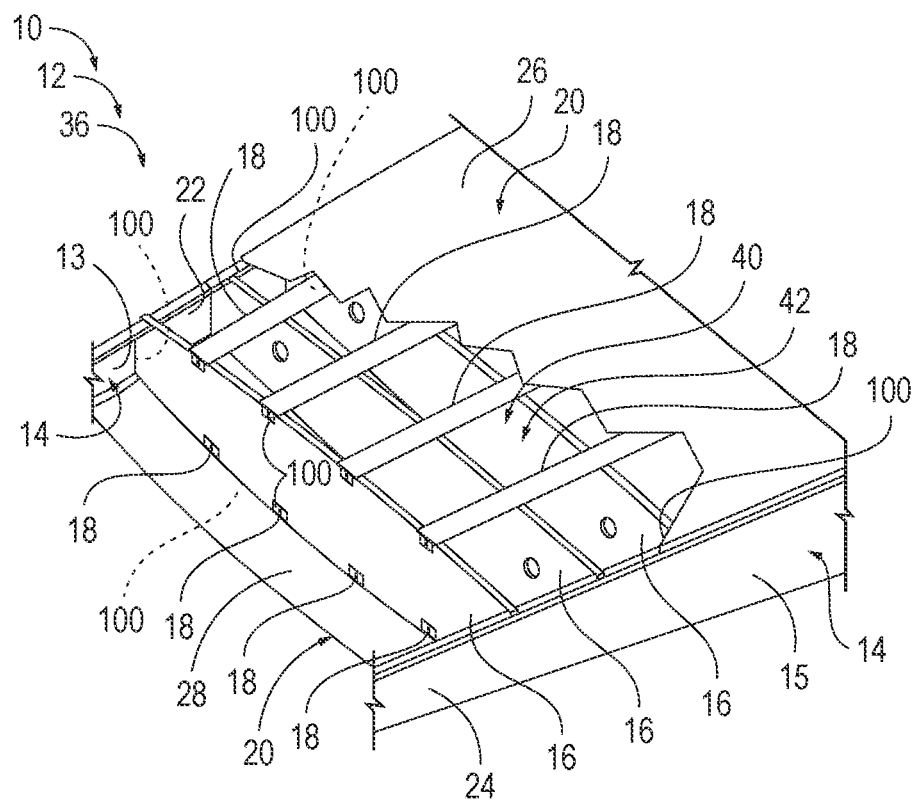
FIG. 2 is a schematic cut-away view of an example of a wing box that comprises at least one aircraft fuel tank joint according to the present disclosure.

As schematically represented in FIG. 2, wing box 36 comprise spars 14, which typically comprise a leading spar 22 and a trailing spar 24 that is spaced aft of the leading spar 22. Wing box 36 also comprises a plurality of ribs 16 that are spaced apart from one another and extend between spars 22, 24, and stringers 18 that are spaced apart from one another and extend transverse to the ribs 16. Wing box 36 further comprises skins 20, namely an upper skin 26 and a lower skin 28. Upper skin 26 and lower skin 28 are joined with ribs 16, stringers 18, and spars 14 such that ribs 16, stringers 18, and spars 14 support at least central portions of upper skin 26 and lower skin 28 spaced apart from one another. Wing boxes 36 may define an internal fuel volume 42 that is utilized in, or forms a portion of, integral aircraft fuel tank 40. Specifically, upper skin 26 and lower skin 28 may form the upper and lower boundaries of internal fuel volume 42, and spars 22, 24 may form the forward and aft boundaries of internal fuel volume 42. Wing box 36 may comprise two ribs 16, which may be referred to as tank end ribs, that form the two end boundaries of internal fuel volume 42.

Wing boxes 36 yet further comprise at least one, and optionally a plurality of, aircraft fuel tank joints 100. Each aircraft fuel tank joint 100 joins together two joined components of wing box 36 that may form a portion of the enclosure to internal fuel volume 42. Each aircraft fuel tank joint 100 may be configured to prevent aircraft fuel contained in internal fuel volume 42 from exiting internal fuel volume 42 through an interface between the two respective components that aircraft fuel tank joint 100 joins together. In other words, aircraft fuel tank joint 100 may be configured to form a seal, or as discussed in more detail herein, a triply redundant seal, between the two components that it joins. When wing box 36 comprises a plurality of aircraft fuel tank joints 100, aircraft fuel tank joints 100, together with the components that they join, collectively enclose internal fuel volume 42. As more specific examples, wing box 36 may comprise an aircraft fuel tank joint 100 that joins leading spar 22 to upper skin 26, an aircraft fuel tank joint 100 that joins leading spar 22 to lower skin 28, an aircraft fuel tank joint 100 that joins trailing spar 24 to upper skin 26, and/or an aircraft fuel tank joint 100 that joins trailing spar 24 to lower skin 28. In some examples, wing box 36 further comprises aircraft fuel tank joints that join skins 20 and one or more ribs 16 and/or that join skins 20 and one or more stringers 18.

FIG. 3 is a schematic cross-sectional view representing aircraft fuel tank joints 100 according to the present disclosure, and FIG. 4 is a schematic cutaway top-down view representing aircraft fuel tank joints 100 according to the present disclosure. The cross-sectional view of FIG. 3 is taken generally perpendicular to the schematic view of FIG. 4, and a portion of a first structural member 104 of aircraft fuel tank joints 100 is cutaway in FIG. 4 for purposes of illustration.

With reference to the examples of FIGS. 3 and 4, aircraft fuel tank joints 100 comprise a first structural member 104 comprising a first joint face 106 and a second structural member 108 comprising a second joint face 112 that extends parallel, or at least generally parallel, to and faces first joint face 106. As referred to herein, a first face extending "generally parallel" to a second face is defined as the first and second faces extending within 5 degrees of parallel to one another. The aircraft fuel tank joint 100 defines a length 102, which may be measured as the distance along which first joint face 106 and second joint face 112 are generally parallel and overlapping.

The aircraft fuel tank joints 100 further comprise a sealant dam 114 and a plurality of sealant zones 118. Each sealant zone 118 comprises, or is substantially filled with, a sealant 119, which may be cured, or be a cured sealant. Sealant dam 114 is compressed between first joint face 106 and second joint face 112 and extends along, or at least substantially along and in some examples fully along, the length 102 of the aircraft fuel tank joint 100. As utilized herein, a first component, such as sealant dam 114, extending "substantially along" the length of a second component or structure, such as aircraft fuel tank joint 100, refers to the first component extending along at least 90% of the length of the second component or structure. The first joint face 106 and the second joint face 112 are spaced away from one another by a gap 110, and the sealant dam 114 has a compressed thickness 116 that defines the gap 110. In some examples, sealant dam 114 supports first joint face 106 and second joint face 112 spaced away from one another such that gap 110 extends therebetween. In other words, the separation between first joint face 106 and second joint face 112 along gap 110, or the thickness of gap 110, may be substantially the same as compressed thickness 116 of sealant dam 114. Examples of the compressed thickness 116 of sealant dam 114 comprise at least 0.01 millimeters (mm), at least 0.02 mm, at least 0.03 mm, at least millimeters, at least 0.05 mm, at least 0.06 mm, at least 0.07 mm, at least 0.08 mm, at least 0.09 mm, at least 0.1 mm, at least 0.11 mm, at most 0.03 mm, at most 0.04 mm, at most mm, at most 0.06 mm, at most 0.07 mm, at most 0.08 mm, at most 0.09 mm, at most mm, at most 0.11 mm, at most 0.12 mm, at most 0.13 mm, at most 0.14 mm, at most mm, and/or at most 0.2 mm.

The plurality of sealant zones 118 and the sealant dam 114 collectively fill, or substantially fill and in some examples fully fill, the gap 110. Each sealant zone 118 may have a sealant zone thickness that is measured parallel to compressed thickness 116 and that may be defined by and/or be substantially the same as compressed thickness 116. In other words, each sealant zone 118 contacts first joint face 106 and second joint face 112. As utilized herein, one element or collection of elements that "substantially fill" a space, such as gap 110, refers to the element or collection of elements filling at least 90% of the volume of the space, such as 90% of the volume of gap 110. Likewise, a space, such as a sealant zone, being "substantially filled" with another element or collection of elements, such as sealant 119, means that at least 90% of the volume of the space is filled with the element or collection of elements.

The plurality of sealant zones 118 comprises at least a first zone of sealant 120 within the gap 110 on a first side 122 of sealant dam 114 and a second zone of sealant 124 on a second side 126 of sealant dam 114. Sealant dam 114 isolates first zone of sealant 120 from second zone of sealant 124. Sealant dam 114, first zone of sealant 120, and second zone of sealant 124 define three independent seals 128 within gap 110. In some examples the three independent seals 128 are configured to prevent aircraft fuel from passing through gap 110 transverse to the length 102 of aircraft fuel tank joint 100. First side 122 of sealant dam 114 additionally or alternatively may be referred to herein as first lateral side 122 of sealant dam 114 and second side 126 additionally or alternatively may be referred to herein as second lateral side 126.

For example, gap 110 may be defined between a first boundary 132 and a second boundary 134 that extend substantially parallel to length 102 and between first structural member 104 and second structural member 108. First boundary 132 and second boundary 134 are separated from one another by sealant dam 114 and the plurality of sealant zones 118. With this in mind, independent seals 128 may be described as being configured to prevent aircraft fuel from passing between first boundary 132 and second boundary 134. In some examples, one of first boundary 132 and second boundary 134 faces internal fuel volume 42 of integral aircraft fuel tank 40, and the other of first boundary 132 and second boundary 134 faces a region exterior to internal fuel volume 42. In such examples, independent seals 128 are configured to restrict aircraft fuel contained in internal fuel volume 42 from passing through aircraft fuel tank joint 100 to the region exterior to internal fuel volume 42.

First boundary 132 and second boundary 134 each may be defined as a plane or surface at which first joint face 106 and second joint face 112 diverge from extending generally parallel to one another. For example, second joint face 112 may terminate at an edge 156 in second structural member 108 that defines first boundary 132, and first joint face 106 may overhang, or extend beyond edge 156. As another example, second joint face 112 may curve, or otherwise turn, away from first joint face 106, and second boundary 134 may be defined by a line along which second joint face 112 forms, or reaches, a threshold minimum angle 158 relative to being parallel to first joint face 106. Examples of threshold minimum angle 158 comprise at least 5°, at least 10°, at least 15°, at most 10°, at most 15°, at most 20°, at most 45°, and/or at most 90°. Additionally or alternatively, first joint face 106 may terminate at an edge 156 and/or curve away from second joint face 112 to define first boundary 132 and/or second boundary 134.

In some examples, sealant 119 of aircraft fuel tank joint 100 is substantially, or completely, contained within first boundary 132 and second boundary 134 of gap 110. In other words, in some such examples, aircraft fuel tank joint 100 does not comprise sealant 119 that extends beyond first boundary 132 or second boundary 134 of gap 110. For examples in which aircraft fuel tank joint 100 comprises sealant that extends beyond first boundary 132 or second boundary 134 of gap 110, the sealant may extend beyond first boundary 132 or second boundary 134 of gap 110 by at most 0.5 millimeters (mm), at most 0.75 mm, at most 1 mm, at most 2 mm, at most 3 mm, and/or at most 5 mm. Stated another way, in some examples, aircraft fuel tank joint 100 does not comprise fillet seals between first structural member 104 and second structural member 108 adjacent to first boundary 132 or second boundary 134 of gap 110.

Traditional fuel tank joints typically comprise at least one, and often a series of, layers of sealant that are applied between the two joined components along the sealant-filled gap to form fillet seals. These fillet seals are intended to form two additional seals in the joint that compliment, or provide redundancy to, the seal formed by the sealant within the gap. However, when cured, these fillet seals typically form an integral body with the sealant within the gap.

By contrast, aircraft fuel tank joints 100 according to the present disclosure comprise three independent seals 128 within gap 110 defined respectively by sealant dam 114 and the zones of sealant partitioned by sealant dam 114. As such, some examples of aircraft fuel tank joints 100 can be formed and/or utilized without fillet seals due to their unique construction that creates at least three independent seals 128 within gap 110. Additionally, in some examples, sealant dam 114 may comprise a different material composition and/or mechanical properties than the sealant in sealant zones 118. Thus, in such examples, sealant dam 114 may act as a crack stopper and/or prevent material failures from propagating between sealant zones 118.

First joint face 106 additionally or alternatively may be referred to as first faying surface 106, and second joint face 112 additionally or alternatively may be referred to as second faying surface 112. In some examples, first joint face 106 and/or second joint face 112 are smooth, planar or at least locally planar. In some examples, first joint face 106 and/or second joint face 112 do not comprise a recess or groove that receives sealant dam 114. In other words, in some examples, sealant dam 114 sits flush on first joint face 106 and second joint face 112, such that compressed thickness 116 of sealant dam 114 is the same as the separation between first joint face 106 and second joint face 112, at least adjacent to sealant dam 114. Sealant dam 114 is applied to, engages, or contacts first joint face 106 and second joint face 112 in any suitable manner. In some examples, sealant dam 114 directly contacts first joint face 106 and second joint face 112. Additionally or alternatively, in some examples, sealant dam 114 is adhered to first joint face 106 and/or second joint face 112 by an adhesive and/or by sealant 119.

First structural member 104 and second structural member 108 are formed from any suitable one or more materials, such as the same or different one or more materials as one another. Examples of suitable materials for first structural member 104 and second structural member 108 comprise metals, metal alloys, aluminum, aluminum alloys, composite materials, fiber reinforced composite materials, materials that are compatible with aircraft fuels, and/or materials that are compatible with sealant 119.

Sealant dam 114 also is formed of any suitable one or more suitable materials, which may be different from those that form first structural member 104, second structural member 108, and/or sealant 119. In particular, sealant dam 114 may mechanically isolate sealant zones 118 from one another when sealant dam 114 comprises a different material composition from sealant 119 in sealant zones 118. In this way, sealant dam 114 is configured to prevent mechanical failure from propagating between first zone of sealant 120 and second zone of sealant 124.

Examples of suitable materials for forming sealant dam 114 comprise materials that are compatible with aircraft fuels, materials that are compatible with sealant 119, materials that are compatible with first structural member 104 and second structural member 108 or other aircraft fuel tank materials, elastic materials, resilient materials, elastomeric polymers, polytetrafluoroethylene (PTFE), expanded PTFE, fluorosilicone, Viton™, fluoropolymer elastomers, and/or nitrile rubber. In some examples, sealant dam 114 is configured to be pliable, elastic, and/or resiliently deforming such that sealant dam 114 is configured to be compressed between first joint face 106 and second joint face 112 to compressed thickness 116 from a nominal thickness that is greater than compressed thickness 116. In some examples, the material composition of sealant dam 114 is selected such that sealant dam 114 deforms to compressed thickness 116 when a preselected compressive force is applied thereto.

Sealant dam 114 comprises any suitable shape and/or any suitable dimensions. Sealant dam 114 defines a cross-sectional shape in a plane normal to length 102 of aircraft fuel tank joint 100, or along a width 136 of gap 110. Examples of suitable cross-sectional shapes of sealant dam 114 comprise an oval, a circle, a rectangle, a rectangle elongated parallel to width 136, and/or a rectangle with outwardly bulged sides that respectively extend towards first boundary 132 and second boundary 134. As a more specific example, sealant dam 114 may conform to the shape of first joint face 106 and second joint face 112 and include free sides that extend between first joint face 106 and second joint face 112. The free sides of sealant dam 114 may expand into a neutral shape due to the compression applied to sealant dam 114, such that sealant dam 114 may have a nominal or uncompressed circular cross-section and an ovular compressed cross-section.

Sealant dam 114 also defines an outermost dam width 152 that may be measured parallel to width 136 of gap 110. Examples of suitable outermost dam widths 152 comprise at least 0.01 mm, at least 0.05 mm, at least 0.08 mm, at least 0.1 mm, at least 0.15 mm, at least 0.2 mm, at least 0.5 mm, at least 1 mm, at most 0.1 mm, at most 0.5 mm, at most 0.08 mm, at most 0.1 mm, at most 0.15 mm, at most 0.2 mm, at most 0.5 mm, at most 1 mm, and/or at most 2 mm.

As mentioned, in some examples, sealant 119 comprises a different material composition than sealant dam 114. Examples of suitable materials for forming sealant 119 comprise polysulfides, polythioethers, materials that are compatible with sealant dam 114, materials that are compatible with first structural member 104 and second structural member 108 or other aircraft fuel tank materials, and/or materials that are compatible with aircraft fuel. More specific examples of suitable materials for forming sealant comprise two-part, manganese dioxide cured polysulfide compounds and vulcanizing silicone rubber adhesives.

In some examples, aircraft fuel tank joints 100 comprise a plurality of fasteners 130, each extending through first structural member 104, second structural member 108, and one of the plurality of sealant zones 118. Fasteners 130 also extend transverse to the length 102 of aircraft fuel tank joint 100 and/or transverse to width 136 of gap 110. Fasteners 130 also may be spaced apart from one another along length 102, such as in an even, or evenly spaced, manner. In some examples, fasteners 130 are installed along a substantial portion, and in some examples an entirety, of the length 102 of aircraft fuel tank joint 100. As utilized herein, a "substantial portion" of length 102 refers to at least 90% of length 102. In some examples, fasteners 130 apply a compressive force between first structural member 104 and second structural member 108 that compresses sealant dam 114 to compressed thickness 116. Examples of suitable fasteners 130 for aircraft fuel tank joints 100 comprise bolts, nuts, rivets, screws, washers, lockbolts, and/or combinations thereof.

In some examples, fasteners 130 comprise, or are organized in, a first subset 138 of fasteners 130 and a second subset 139 of fasteners 130 that are spaced apart from one another along the width of gap 110, such that first subset 138 of fasteners 130 are positioned closer to first boundary 132 than the second subset 139 of fasteners 130, and second subset 139 of fasteners 130 are positioned closer to second boundary 134 than first subset 138 of fasteners 130. In some examples, each subset of fasteners 130 extends in a row that is generally parallel to length 102. In some examples, first subset 138 and second subset 139 of fasteners 130 extend generally parallel to one another along the length 102 of aircraft fuel tank joint 100.

As perhaps best seen in FIG. 4, sealant dam 114 may comprise any suitable conformation and/or extend along any suitable portion of first joint face 106 and second joint face 112. For example, gap 110 defines a width 136 that may be measured between first boundary 132 and second boundary 134 normal to the length 102 of aircraft fuel tank joint 100. Sealant dam 114 may extend within width 136 of gap 110, or between first boundary 132 and second boundary 134, along a substantial portion of the length 102 of aircraft fuel tank joint 100. Typically, sealant dam 114 is separated from first boundary 132 by first zone of sealant 120 and is separated from second boundary 134 by second zone of sealant 124.

In some examples, sealant dam 114 comprises a substantially linear conformation and/or follows the shape of first joint face 106 and second joint face 112. In some examples, sealant dam 114 extends at a substantially fixed distance between first boundary 132 and second boundary 134 along a substantial portion of the length 102 of aircraft fuel tank joint 100. In other words, in some examples, sealant dam 114 extends generally parallel to first boundary 132 and second boundary 134 along a substantial portion of the length 102 of aircraft fuel tank joint 100. In some examples, sealant dam 114 substantially bisects the width 136 of gap 110 along at least a substantial portion of length 102. As utilized herein, "substantially bisects" refers to sealant dam 114 extending within 10% of width 136 from a center point of width 136. In some examples, sealant dam 114 extends between first subset 138 and second subset 139 of fasteners 130. In some such examples, first subset 138 of fasteners 130 each extend through first zone of sealant 120, and second subset 139 of fasteners 130 each extend through second zone of sealant 124. In other examples, sealant dam 114 is positioned to extend between first boundary 132 and first subset 138 of fasteners 130 such that first zone of sealant 120 extends between sealant dam 114 and first boundary 132, and both first subset 138 and second subset 139 of fasteners 130 extend through second zone of sealant 124. In yet other examples, sealant dam 114 is positioned to extend between second boundary 134 and second subset 139 of fasteners 130 such that second zone of sealant 124 extends between second boundary 134 and sealant dam 114, and both first subset 138 and second subset 139 of fasteners 130 extend through first zone of sealant 120.

Additionally or alternatively, in some examples, sealant dam 114 comprises a patterned and/or non-linear conformation in which sealant dam 114 does not extend at a fixed distance from first boundary 132 and second boundary 134 of gap 110. In some such examples, sealant dam 114 is conformed in a pattern in which sealant dam 114 undulates in separation from first boundary 132 and second boundary 134 as it extends substantially along the length 102 of aircraft fuel tank joint 100. Such a configuration may enhance the capacity of sealant dam 114 to distribute compressive loads across the width 136 of gap 110. In such examples, sealant dam 114 may be described as having an undulating or oscillating conformation and/or as being an undulating, patterned or oscillating sealant dam. As more specific examples of the above, sealant dam 114 may comprise a zig zag shape, a square wave shape, and/or a sinusoidal shape along length 102.

In some examples, sealant dam 114 curves around, optionally spaced away from, a region of at least some of the plurality of fasteners 130. In some examples, fasteners 130 comprise a first boundary-facing region 148 that faces first boundary 132 and a second boundary-facing region 149 that faces second boundary 134. In some examples, sealant dam 114 curves around first boundary-facing region 148 of some fasteners 130 and curves around second boundary-facing region 149 of some other fasteners 130. In some examples, sealant dam 114 curves around first boundary-facing region 148 and second boundary-facing region 149 of adjacent or spaced apart fasteners 130 in an alternating manner. In any such examples, sealant dam 114 extends between some fasteners 130 and first boundary 132 and extends between other fasteners 130 and second boundary 134.

As perhaps best seen in FIG. 4, in some examples, fasteners 130 comprise large diameter fasteners 160 and small diameter fasteners 162. In some such examples, large diameter fasteners 160 may apply a greater compressive force across aircraft fuel tank joint 100 than do small diameter fasteners 162. In some examples, sealant dam 114 is patterned to extend around and outside of first boundary-facing region 148 or second boundary-facing region 149 of large diameter fasteners 160. In some such examples, sealant dam 114 also is conformed to extend between, inside of, or linearly relative to, small diameter fasteners 162.

For some examples in which aircraft fuel tank joints 100 comprise first subset 138 and second subset 139 of fasteners 130, sealant dam 114 is patterned, conformed, and/or undulates to extend outside of first boundary-facing region 148 of at least some fasteners 130 (e.g., large diameter fasteners 160) of the first subset 138 and to extend outside of second boundary-facing region 149 of at least some fasteners 130 (e.g., large diameter fasteners 160) of the second subset 139. In other words, sealant dam 114 may be conformed patterned, and/or undulate to extend between first boundary 132 and at least some of, and optionally each fastener 130 of, first subset 138 of fasteners 130 and to extend between second boundary 134 and at least some of, and optionally each fastener 130 of, second subset 139 of fasteners 130.

Aircraft fuel tank joint 100 may be comprised and/or utilized in any suitable portion of integral aircraft fuel tank 40. For examples in which integral aircraft fuel tank 40 is comprised in or defined by a wing box, such as the example wing boxes 36 of FIG. 2, first structural member 104 may be one of a skin 20, a stringer 18, a rib 16, and a spar 14, and second structural member 108 may be another other of the skin 20, the stringer 18, the rib 16, and the spar 14. In more specific examples, first structural member 104 is a skin 20, such as upper skin 26 or lower skin 28, and second structural member 108 is a spar 14, such as leading spar 22 or trailing spar 24.

FIG. 5 is a partial isometric view showing a somewhat less schematic example of an aircraft fuel tank joint 100 according to the present disclosure. In the example of FIG. 5, aircraft fuel tank joint 100 is comprised in an integral fuel tank 40 of a wing box 36. Specifically, first structural member 104 is a skin 20 having first joint face 106, and second structural member 108 is a spar 14. Spar 14 comprises an upright wall 46 and a flange 48 that extends generally perpendicular to upright wall 46 and that comprises second joint face 112. Aircraft fuel tank joint 100 comprises sealant dam 114, first zone of sealant 120 extending from the first side of sealant dam 114 towards first boundary 132 and second zone of sealant 124 extending from the second side of sealant dam 114 towards second boundary 134. Second joint face 112 bends away from first joint face 106 to define first boundary 132 of gap 110, as discussed herein, and first zone of sealant 120 does not extend beyond first boundary 132. First zone of sealant 120, sealant dam 114, and second zone of sealant 124 each contact first joint face 106 and second joint face 112 along a substantial portion of the area thereof, such that first zone of sealant 120, sealant dam 114, and second zone of sealant 124 form three independent seals 128 within gap 110.

FIG. 6 provides a flowchart that represents illustrative, non-exclusive examples of methods 500 of assembling an aircraft fuel tank joint according to the present disclosure. In FIG. 6, some steps are illustrated in dashed boxes indicating that such steps may be optional, or may correspond to an optional version of methods 500 according to the present disclosure. That said, not all methods 500 according to the present disclosure are required to comprise each of the steps illustrated in solid boxes. The methods and steps illustrated in FIG. 6 are not limiting, and other methods and steps are within the scope of the present disclosure, comprising methods having greater than or fewer than the number of steps illustrated, as understood from the discussion herein.

Methods 500 may be performed to assemble aircraft fuel tank joint 100 that is illustrated and discussed herein with reference to FIGS. 1-5. That is, the aircraft fuel tank joint formed according to methods 500 and/or discussed herein with reference to FIG. 6 and methods 500 may incorporate any of the features, functions, components, materials, etc., as well as variants thereof, as those discussed herein with reference to FIGS. 1-5 without requiring the inclusion of all such features, functions, materials, etc. Likewise, aircraft fuel tank joints 100 discussed herein with reference to FIGS. 1-5 may incorporate any of the features, functions, materials, etc. as those discussed herein with reference to FIG. 6 and methods 500, without requiring the inclusion of all such features, functions, components, materials etc. Where appropriate, the reference numerals from FIGS. 1-5 may be utilized to indicate corresponding parts of the aircraft fuel tank joints discussed herein with reference to FIG. 6 and methods 500.

Methods 500 comprise substantially filling 502 a gap between a first joint face of a first structural member of the aircraft fuel tank joint and a second joint face of a second structural member of the aircraft fuel tank joint with a sealant dam and a plurality of sealant zones. The substantially filling 502 may comprise applying the sealant dam to a joint face at 504 and/or applying sealant to the joint face at 506. Methods 500 also comprise compressing 512 the sealant dam between the first joint face and the second joint face. Methods 500 further may comprise mating the structural members at 508, installing fasteners at 510, and/or curing the sealant at 514.

The substantially filling 502 comprises substantially filling the gap 110 with a first zone of sealant 120 on a first side 122 of the sealant dam 114 and with a second zone of sealant 124 on a second side 126 of the sealant dam 114. The substantially filling at 502 further comprises forming three independent seals 128 within the gap, two of which being defined by the first and the second zones of sealant and a third of which being defined by the sealant dam 114. In some examples, the substantially filling at 502 comprises contacting, adhering, or otherwise engaging the sealant dam 114 and the plurality of sealant zones 118 with the first joint face 106 and the second joint face 112 along a substantial portion of the area of the first joint face 106 and the second joint face 112. In some examples, the substantially filling at 502 comprises substantially filling the gap with sealant dam 114 and sealant 119 such that sealant 119 is substantially contained between, or does not extend substantially past, a first boundary 132 of the gap and a second boundary 134 of the gap.

As shown in FIG. 6, in some examples, the substantially filling 502 comprises applying 504 the sealant dam to a joint face, which is one of the first joint face 106 and the second joint face 112. When comprised in the substantially filling 502, the applying 504 the sealant dam 114 comprises applying the sealant dam along a substantial portion of the length of the joint face and/or the length 102 of aircraft fuel tank joint 100. In some examples, the applying 504 the sealant dam 114 comprises applying the sealant dam 114 with or to have a nominal thickness.

The applying 504 the sealant dam is performed in any suitable manner. In some examples, the applying 504 the sealant dam comprises forming the sealant dam 114 on the joint face. In some such examples, the applying 504 comprises additively manufacturing the sealant dam 114 on the joint face, extruding and subsequently curing the sealant dam on the joint face, and/or molding the sealant dam 114 on the joint face.

In other examples, the applying 504 the sealant dam comprises applying the sealant dam to the joint face as a contiguous, or monolithic, body. In some such examples, methods 500 comprise forming the sealant dam prior to the applying 504, which comprises forming the sealant dam 114 in any suitable manner, such as by molding, additively manufacturing, and/or die-cutting the sealant dam 114. In some examples, the sealant dam 114 comprises an adhesive applied along a region that the sealant dam 114 will contact the joint face, and the applying 504 comprises adhering the sealant dam 114 to the joint face via the adhesive applied to the sealant dam 114.

The applying 504 the sealant dam comprises applying the sealant dam 114 in any suitable conformation and/or position along the joint face. In some examples, the applying 504 the sealant dam comprises applying the sealant dam 114 to the joint face to extend at a fixed distance between the first boundary 132 and the second boundary 134 of the gap 110 or such that the sealant dam 114 extends substantially parallel to the length 102 of the aircraft fuel tank joint 100. In some such examples, the applying 504 the sealant dam 114 comprises applying the sealant dam 114 to the joint face to extend between a first subset 138 of fasteners 130 and a second subset 139 of fasteners 130 in the aircraft fuel tank joint 100.

Additionally or alternatively, in some examples, the applying 504 the sealant dam 114 comprises applying the sealant dam 114 in a patterned conformation, for example an undulating conformation, such that the separation between sealant dam 114, the first boundary 132, and the second boundary 134 of the gap 110 varies as sealant dam 114 extends substantially along the length 102 of the aircraft fuel tank joint 100. In some such examples, the applying 504 the sealant dam 114 comprises applying the sealant dam 114 to extend outside of a first boundary-facing region 148 of at least some of the first subset 138 of fasteners 130 and to extend outside of the second boundary-facing region 149 of at least some of the second subset 139 of fasteners 130, such as discussed herein.

With continued reference to FIG. 6, in some examples, the substantially filling 502 comprises applying 506 sealant to the joint face, which may be the one of the first joint face 106 and the second joint face 112 to which the sealant dam 114 is applied. When comprised in the substantially filling 502, the applying 506 sealant to the joint face comprises applying sealant 119 along a substantial portion of the length of the joint face and/or a substantial portion of the length of aircraft fuel tank joint 100. In some examples, the applying 506 sealant to the joint face comprises applying sealant between and/or not substantially outside lines along the joint face corresponding to the first boundary 132 and the second boundary 134 of the gap 110. In some examples, the applying 506 sealant to the joint face comprises applying sealant 119 to cover a substantial portion of the area of the joint face that is not covered by the sealant dam 114. In some examples, the applying 506 sealant to the joint face comprises applying sealant 119 to the joint face 106 on the first side 122 of the sealant dam 114 and to the joint face 106 on the second side 126 of the sealant dam 114.

In some examples, the applying 506 sealant is performed subsequent to the applying 504 the sealant dam. In some such examples, the applying 506 sealant comprises applying sealant 119 to the joint face to a thickness of sealant on the joint face that is substantially the same as the nominal thickness of the sealant dam 114 on the joint face. In other words, the applying 506 sealant may comprise utilizing the nominal thickness of the sealant dam 114 on the joint face as an index for a thickness up to which the sealant is to be applied to the joint face.

When comprised in the substantially filling, the applying 506 sealant comprises applying the sealant 119 in any suitable manner. In some examples, the applying 506 sealant comprises applying uncured sealant to the first joint face 106, such that the sealant 119 is uncured immediately subsequent to the applying 506, during mating at 508, during compressing at 512, and/or prior to curing at 514. In some examples, the applying 506 comprises brushing, rolling, painting, pouring, and/or spraying uncured or liquid sealant to the first joint face 106.

In some examples, methods 500 comprise mating 508 the first structural member and the second structural member at 508. When comprised in methods 500, the mating 508 comprises mating the first structural member 104 and the second structural member 108 along the aircraft fuel tank joint 100. In some examples, the mating 508 comprises aligning the first joint face 106 of the first structural member 104 with the second joint face 112 of the second structural member 108. In some examples, the mating 508 comprises placing the other joint face in contact with the sealant dam 114 applied to the joint face along at least a substantial portion of the length of the second joint face 112. As utilized herein, the "other joint face" refers to the second joint face 112 when the sealant dam 114 is applied to the first joint face 106 during the applying 504 and vice versa. In some examples, the mating 508 comprises placing the other joint face in contact with the plurality of sealant zones 118. In some examples, the mating 508 comprises forming the gap 110 between the first joint face 106 and the second joint face 112. In some such examples, the mating 508 comprises forming the gap 110 with an initial thickness that corresponds to, or is substantially the same as, the nominal thickness of the sealant dam 114 and/or that is greater than the compressed thickness 116 of the sealant dam 114. When comprised in methods 500, the mating 508 may be performed subsequent to the applying 504, subsequent to the applying 506, prior to the compressing 512, prior to the installing 510, and/or prior to the curing 514.

In some examples, methods 500 comprise installing 510 a plurality of fasteners 130 in the aircraft fuel tank joint 100. When comprised in methods 500, the installing 510 comprises installing each fastener 130 such that it extends through the first structural member 104, the second structural member 108, and a sealant zone 118. In some examples, the installing 510 comprises forming a plurality of bores in the first structural member 104 along the aircraft fuel tank joint 100 and a corresponding plurality of bores in the second structural member 108, and installing the plurality of fasteners 130 to extend through the plurality of bores formed in the first and second structural members 104, 108. For some examples in which the installing 510 comprises forming bores in the first and second structural members, the bores are formed prior to the substantially filling 502 (e.g., the first and second structural members are predrilled). For other examples in which the installing 510 comprises forming bores in the first and second structural members, the installing 510 comprises forming the bores subsequent to the substantially filling 502 and/or subsequent to the mating 508.

As shown in FIG. 6, methods 500 comprise compressing 512 the sealant dam 114 between the first joint face 106 and the second joint face 112 to a compressed thickness 116. As mentioned, in some examples, the sealant dam 114 comprises a nominal thickness that is greater than the compressed thickness prior to the compressing. In such examples, the compressing 512 comprises compressing the sealant dam 114 from the nominal thickness to the compressed thickness 116. In some examples, compressing 512 comprises reducing a thickness of the gap 110 from being substantially the same as the nominal thickness of the sealant dam 114 to be substantially the same as the compressed thickness 116 of the sealant dam 114. In such examples, the compressing 512 comprises reducing a volume of the gap 110.

In some examples, the sealant 119 in each sealant zone 118 is uncured prior to and/or during the compressing 512. In some examples, the compressing 512 comprises flowing sealant 119, such as uncured or liquid sealant, within the gap 110. In some such examples, the compressing 512 comprises flowing sealant 119 to substantially fill the first zone of sealant 120 and/or flowing sealant 119 to substantially fill the second zone of sealant 124. In some examples, the compressing 512 comprises flowing sealant 119 within the first zone of sealant 120 towards the first boundary 132 of the gap 110 and/or flowing sealant 119 within the second zone of sealant 124 towards the second boundary 134 of the gap 110. In some examples, the compressing 512 comprises flowing sealant 119 from the first zone of sealant 120 past the first boundary 132 of the gap 110 and/or flowing sealant 119 from the second zone of sealant 124 past the second boundary 134 of the gap 110. In some such examples, methods 500 further comprise, subsequent to the compressing 512, removing at least some of, and optionally substantially all of, the sealant 119 that extends or flows past the first boundary 132 and/or the second boundary 134 of the gap 110.

In some examples, the compressing 512 comprises applying a preselected compressive force between the first structural member 104 and the second structural member 108. In some such examples, the preselected compressive force corresponds to a compressive force that is needed to compress the sealant dam 114 from the nominal thickness to the compressed thickness 116 and/or to flow the sealant 119 to substantially fill the first and second zones of sealant 120, 124. For some examples in which methods 500 comprise installing 510, the compressing 512 comprises applying a preselected torque to at least some of, and optionally each of, the fasteners 130 such that the fasteners 130 apply the preselected compressive force between the first structural member 104 and the second structural member 108.

The compressing 512 is performed with any suitable sequence or timing within methods 500, such as subsequent to the filling 502, subsequent to the mating 508, subsequent to the installing 510 and/or prior to curing 514.

In some examples, methods 500 further comprise curing 514 the sealant within the gap. When comprised in methods 500, the curing 514 comprises curing the sealant 119 within the plurality of sealant zones 118. As mentioned, in some examples, the sealant 119 within the plurality of sealant zones may be uncured or liquid prior to and/or during the compressing 512. In such examples, the curing 514 is performed subsequent to the compressing at 512. When comprised in methods 500, the curing 514 is performed in any suitable manner. As examples, the curing may comprise permitting the uncured sealant to set and/or solidify.

Illustrative, non-exclusive examples of inventive subject matter according to the present disclosure are described in the following enumerated paragraphs:

A. An aircraft fuel tank joint (100) having a length (102), the aircraft fuel tank joint (100) comprising:
a first structural member (104) comprising a first joint face (106);
a second structural member (108) comprising a second joint face (112) that extends generally parallel to and faces the first joint face (106), wherein the first joint face (106) is spaced away from the second joint face by a gap (110);
a sealant dam (114) compressed between the first joint face (106) and the second joint face (112) and extending substantially along the length (102), wherein the sealant dam (114) has a compressed thickness (116) that defines the gap (110); and
a plurality of sealant zones (118), comprising:
a first zone of sealant (120) within the gap (110) on a first side (122) of the sealant dam (114); and
a second zone of sealant (124) within the gap (110) on a second side (126) of the sealant dam (114);
wherein the sealant dam (114) isolates the first zone of sealant (120) from the second zone of sealant (124);
wherein the sealant dam (114), combined with the plurality of sealant zones (118), substantially fill the gap (110); and
wherein the sealant dam (114), the first zone of sealant (120), and the second zone of sealant (124) define three independent seals (128) within the gap (110).

A1. The aircraft fuel tank joint (100) of paragraph A, wherein the gap (110) is defined between a first boundary (132) and a second boundary (134) that extend substantially parallel to the length (102) of the aircraft fuel tank joint (100), wherein the first boundary (132) and the second boundary (134) are separated from one another by the sealant dam (114) and at least the first zone of sealant (120) and the second zone of sealant (124).

A2. The aircraft fuel tank joint (100) of paragraph A1, wherein the aircraft fuel tank joint (100) does not comprise a sealant (119) that extends beyond the first boundary (132) or the second boundary (134) of the gap (110).

A3. The aircraft fuel tank joint (100) of any of paragraphs A1-A2, wherein the aircraft fuel tank joint (100) does not comprise a sealant fillet that extends beyond the first boundary (132) or the second boundary (134) of the gap (110).

A4. The aircraft fuel tank joint (100) of any of paragraphs A1-A3, wherein one of the first boundary (132) and the second boundary (134) faces an internal fuel volume

(42) and the other of the first boundary (132) and the second boundary (134) faces a region exterior to the internal fuel volume (42).

A5. The aircraft fuel tank joint (100) of any of paragraphs A1-A4, wherein the sealant dam (114) extends at a substantially fixed distance between the first boundary (132) and the second boundary (134) along a substantial portion of the length (102) of the aircraft fuel tank joint (100).

A6. The aircraft fuel tank joint (100) of any of paragraphs A1-A5, wherein the gap (110) defines a width (136) that is measured between the first boundary (132) and the second boundary (134) normal to the length (102) of the aircraft fuel tank joint (100), and wherein the sealant dam (114) substantially bisects the width (136) of the gap (110) along a/the substantial portion of the length of the aircraft fuel tank joint (100).

A7. The aircraft fuel tank joint (100) of any of paragraphs A1-A5, wherein the sealant dam (114) extends in a non-linear pattern along the length of the aircraft fuel tank joint (100).

A7.1. The aircraft fuel tank joint (100) of paragraph A7, wherein the sealant dam (114) is formed in a pattern in which the sealant dam (114) undulates in separation from the first boundary (132) and the second boundary (134) as it substantially extends along the length (102) of the aircraft fuel tank joint (100).

A8. The aircraft fuel tank joint (100) of any of paragraphs A-A7, further comprising a plurality of fasteners (130), each extending generally transverse to the length (102) of the aircraft fuel tank joint (100) and through the first structural member (104), the second structural member (108), and one of the plurality of sealant zones (118).

A9. The aircraft fuel tank joint (100) of paragraph A8, wherein the gap (110) defines a width (136) that is measured between a/the first boundary (132) of the gap (110) and a/the second boundary (134) of the gap (110), wherein the plurality of fasteners (130) comprises a first subset (138) of fasteners (130) and a second subset (139) of fasteners (130) that are spaced apart from one another along the width (136) of the gap (110) such that the first subset (138) of fasteners (130) is positioned closer to the first boundary (132) of the gap (110) than the second subset (139) and the second subset (139) of fasteners (130) is positioned closer to the second boundary (134) of the gap (110).

A10. The aircraft fuel tank joint (100) of paragraph A9, wherein the sealant dam (114) extends between the first subset (138) of fasteners (130) and the second subset (139) of fasteners (130), such that the first subset (138) of fasteners (130) each extend through the first zone of sealant (120) and the second subset (139) of fasteners (130) each extend through the second zone of sealant (124).

A11. The aircraft fuel tank joint (100) of paragraph A9, wherein the first subset (138) of fasteners (130) each comprises a first boundary-facing region (148) that faces the first boundary (132) of the gap (110) and the second subset (139) of the plurality of fasteners (130) each comprises a second boundary-facing region (149) that faces the second boundary (134) of the gap (110), and wherein the sealant dam (114) is formed in a pattern that extends outside of the first boundary-facing region (148) of at least some of the first subset (138) of fasteners (130) and that extends outside of the second boundary-facing region (149) of at least some of the second subset (139) of fasteners (130).

A11.1 The aircraft fuel tank joint (100) of any of paragraphs A1-A11, wherein the three independent seals (128) are configured to prevent aircraft fuel from passing through the gap (110) transverse to the length (102) of the aircraft fuel tank joint (100).

A12. The aircraft fuel tank joint (100) of any of paragraphs A-A11, wherein at least one of:
(i) the sealant dam (114) sits flush on the first joint face (106) and the second joint face (112); or
(ii) the first joint face (106) and the second joint face (112) do not comprise a groove in which the sealant dam (114) is received.

A13. The aircraft fuel tank joint (100) of any of paragraphs A-A12, wherein the sealant dam (114) mechanically isolates the first zone of sealant (120) from the second zone of sealant (124).

A14. The aircraft fuel tank joint (100) of paragraph A13, wherein the sealant dam (114) is configured to prevent mechanical failure from propagating between the first zone of sealant (120) and the second zone of sealant (124).

A15. The aircraft fuel tank joint (100) of any of paragraphs A-A14, wherein the compressed thickness (116) of the sealant dam (114) is:
at least 0.01 millimeters (mm), at least 0.02 mm, at least 0.03 mm, at least 0.04 millimeters, at least 0.05 mm, at least 0.06 mm, at least 0.07 mm, at least 0.08 mm, at least 0.09 mm, at least 0.1 mm, or at least 0.11 mm; and
at most 0.03 mm, at most 0.04 mm, at most 0.05 mm, at most 0.06 mm, at most 0.07 mm, at most 0.08 mm, at most 0.09 mm, at most 0.1 mm, at most 0.11 mm, at most 0.12 mm, at most 0.13 mm, at most 0.14 mm, at most 0.15 mm, or at most 0.2 mm.

A16. The aircraft fuel tank joint (100) of any of paragraphs A-A15, wherein the sealant dam (114) defines a cross-sectional shape in a plane normal to the length (102) of the aircraft fuel tank joint (100), wherein the cross-sectional shape is at least one of an oval, a rectangle, a rectangle elongated along a/the width (136) of the gap (110), and a rectangle with outwardly bulged sides that respectively extend towards a/the first boundary (132) of the gap (110) and a/the second boundary (134) of the gap (110).

A17. The aircraft fuel tank joint (100) of any of paragraph A-A16, wherein the sealant dam (114) comprises a sealant dam material composition, wherein the sealant dam material composition comprises at least one of: polytetrafluoroethylene (PTFE), expanded PTFE, fluorosilicone, nitrile rubber, and/or fluoropolymer elastomers.

A18. The aircraft fuel tank joint (100) of any of paragraphs A-A17, wherein a/the sealant dam material composition of the sealant dam (114) is different from a sealant material composition of any sealant zone (118) of the plurality of sealant zones (118).

A19. The aircraft fuel tank joint (100) of any of paragraphs A-A18, wherein the first structural member (104) is one of a skin (20), a stringer (18), a rib (16), or a spar (14), and wherein the second structural member (108) is another of the skin (20), the stringer (18), the rib (16), or the spar (14).

A20. Use of the aircraft fuel tank joint (100) of any of paragraphs A-A19 to seal an integral aircraft fuel tank (40).

A21. The aircraft fuel tank joint (100) of any of paragraphs A-A20 formed by the methods of any of paragraphs C-C12.

B. An aircraft wing box (36), comprising:

an upper skin (26);

a lower skin (28);

a leading spar (22);

a trailing spar (24) spaced aft of the leading spar (22);

wherein the leading spar (22) and the trailing spar (24) support the upper skin (26) and the lower skin (28) spaced from one another to define an internal volume between the leading spar (22), the trailing spar (24), the upper skin (26), and the lower skin (28); and at least one of the aircraft fuel tank joint (100) of any of paragraphs A-A21, wherein the first structural member (104) is one of the upper skin (26) and the lower skin (28), and wherein the second structural member (108) is one of the leading spar (22) or the trailing spar (24).

B1. The aircraft wing box (36) of paragraph B, wherein the aircraft wing box (36) comprises a plurality of the aircraft fuel tank joints (100) of any of paragraphs A-A21, which comprises a first aircraft fuel tank joint (100) formed between the upper skin (26) and the leading spar (22), a second aircraft fuel tank joint (100) formed between the upper skin (26) and the trailing spar (24), a third aircraft fuel tank joint formed between the lower skin (28) and the leading spar (22), and a fourth aircraft fuel tank joint (100) formed between the lower skin (28) and the trailing spar (24).

B2. The aircraft wing box (36) of any of paragraphs B-B1, further comprising a plurality of ribs (16) and a plurality of stringers (18) extending transverse to the ribs (16).

B3. The aircraft wing box (36) of paragraph B2, wherein two ribs of the plurality of ribs (16) are tank end ribs (16) that enclose an integral aircraft fuel tank (40) within the internal volume of the wing box (36).

B4. Use of the aircraft wing box (36) of any of paragraphs B-B3 as an integral aircraft fuel tank (40).

B5. An aircraft (10), comprising:

a fuselage (11); and wings (12) supported by the fuselage (11), wherein each wing (12) comprises the aircraft wing box (36) of any of paragraphs B-B4.

B6. Use of the aircraft (10) of paragraph B5 to transport a payload.

C. A method (500) of assembling an aircraft fuel tank joint (100) having a length (102), the method (500) comprising:

substantially filling (502) a gap (110) between a first joint face (106) of a first structural member (104) of the aircraft fuel tank joint (100) and a second joint face (112) of a second structural member (108) of the aircraft fuel tank joint (100) with a sealant dam (114) and a plurality of sealant zones (118), wherein the plurality of sealant zones (118) comprises a first zone of sealant (120) on a first side (122) of the sealant dam (114) and a second zone of sealant (124) on a second side (126) of the sealant dam (114); and compressing (512) the sealant dam (114) between the first joint face (106) and the second joint face (112) to a compressed thickness (116).

C1. The method (500) of paragraph C, wherein the substantially filling (502) comprises applying (504) the sealant dam (114) to the first joint face (106) along a substantial portion of the length (102) of the aircraft fuel tank joint (100).

C2. The method (500) of paragraph C1, wherein the substantially filling (502) comprises applying (506) sealant to one of the first joint face (106) and the second joint face (112) along the substantial portion of the length (102) of the aircraft fuel tank joint (100).

C3. The method (500) of paragraph C2, wherein the applying (506) sealant comprises applying sealant (119) to the one of the first joint face (106) and the second joint face (112) on a first side (122) of the sealant dam (114) and on a second side (126) of the sealant dam (114).

C4. The method (500) of any of paragraphs C2-C3, wherein the applying (506) sealant is performed subsequent to the applying (504) the sealant dam (114).

C5. The method (500) of any of paragraphs C2-C4, wherein the sealant dam (114) comprises a nominal thickness prior to the compressing (512) that is greater than the compressed thickness (116), and wherein the applying (506) sealant comprises applying sealant (119) on the one of the first joint face (106) and the second joint face (112) to a thickness of sealant on the one of first joint face (106) and the second joint face (112) that is substantially the same as the nominal thickness of the sealant dam (114).

C6. The method (500) of any of paragraphs C-C5, wherein the compressing (512) comprises applying a preselected compressive force between the first structural member (104) and the second structural member (108), wherein the preselected compressive force corresponds to a compressive force that is needed to compress the sealant dam (114) from a/the nominal thickness to the compressed thickness (116).

C7. The method (500) of paragraph C6, wherein the compressing (512) comprises reducing a thickness of gap (110) to be substantially the same as the compressed thickness (116) of the sealant dam (114).

C8. The method (500) of any of paragraphs C-C7, further comprising installing (510) a plurality of fasteners (130) in the aircraft fuel tank joint (100), wherein the plurality of fasteners (130) extend transverse to the length (102) of the aircraft fuel tank joint (100) and through the first structural member (104), the gap (110), and the second structural member (108).

C9. The method (500) of paragraph C8, when depending from paragraph C6, wherein the compressing (512) comprises applying a preselected torque to each of the plurality of fasteners (130) such that the plurality of fasteners (130) apply the preselected compressive force between the first structural member (104) and the second structural member (108).

C10. The method (500) of any of paragraphs C-C9, further comprising operably mating (508) the first structural member (104) with the second structural member (108) along the first joint face (106) and the second joint face (112).

C11. The method (500) of paragraph C10, wherein the operably mating (508) comprises aligning the first joint face (106) with the second joint face (112) and placing the second joint face (112) in contact with the sealant dam (114).

C12. The method (500) of any of paragraphs C-C11, further comprising curing (514) sealant (119) in the plurality of sealant zones (118) within the gap (110), wherein the curing (514) the curing the sealant (119) in the plurality of sealant zones (118) within the gap (110) is performed subsequent to the compressing (512), and wherein sealant (119) in the plurality of sealant zones (118) is uncured prior to the compressing (512).

C13. The method (500) of any of paragraphs C-C12, wherein the aircraft fuel tank joint (100) is the aircraft fuel tank joint (100) of any of paragraphs A-B6.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

Unless specifically defined elsewhere herein, the term "substantially," when modifying a degree or relationship, includes not only the recited "substantial" degree or relationship, but also the full extent of the recited degree or relationship. A substantial amount of a recited degree or relationship may include at least 90% of the recited degree or relationship. For example, an object that is substantially formed from a material includes an object for which at least 90% of the object is formed from the material and also includes an object that is completely formed from the material. As another example, a first direction that is substantially parallel to a second direction includes a first direction that forms an angle with respect to the second direction that is at most 90 degrees and also includes a first direction that is exactly parallel to the second direction. As another example, a first length that is substantially equal to, or substantially the same as, a second length includes a first length that is at least 90% of the second length, a first length that is equal to the second length, and a first length that exceeds the second length such that the second length is at least 90% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft fuel tank joint having a length, the aircraft fuel tank joint comprising:
   a first structural member comprising a first joint face;
   a second structural member comprising a second joint face that extends generally parallel to and faces the first joint face, wherein the first joint face is spaced away from the second joint face by a gap;
   a sealant dam compressed between the first joint face and the second joint face and extending substantially along the length, wherein the sealant dam has a compressed thickness that defines the gap; and
   a plurality of sealant zones, comprising:
      a first zone of sealant within the gap on a first side of the sealant dam; and
      a second zone of sealant within the gap on a second side of the sealant dam;
   wherein the sealant dam isolates the first zone of sealant from the second zone of sealant;
   wherein the sealant dam, combined with the plurality of sealant zones, substantially fill the gap; and
   wherein the sealant dam, the first zone of sealant, and the second zone of sealant define three independent seals within the gap.

2. The aircraft fuel tank joint of claim 1, wherein the gap is defined between a first boundary and a second boundary that extend substantially parallel to the length of the aircraft fuel tank joint, wherein the first boundary and the second boundary are separated from one another by the sealant dam and at least the first zone of sealant and the second zone of sealant.

3. The aircraft fuel tank joint of claim 2, wherein one of the first boundary and the second boundary faces a fuel volume and the other of the first boundary and the second boundary interfaces a region exterior to the fuel volume.

4. The aircraft fuel tank joint of claim 2, wherein the sealant dam extends at a substantially fixed distance between the first boundary and the second boundary along a substantial portion of the length of the aircraft fuel tank joint.

5. The aircraft fuel tank joint of claim 2, wherein the sealant dam extends in a non-linear pattern along the length of the aircraft fuel tank joint.

6. The aircraft fuel tank joint of claim 1, further comprising a plurality of fasteners, each extending generally transverse to the length of the aircraft fuel tank joint and through the first structural member, the second structural member, and one of the plurality of sealant zones.

7. The aircraft fuel tank joint of claim 6, wherein the plurality of fasteners comprises a first subset of fasteners and a second subset of fasteners that are spaced apart from one another along a width of the gap such that the first subset of fasteners are positioned closer to a first boundary of the gap than the second subset and the second subset of fasteners are positioned closer to a second boundary of the gap.

8. The aircraft fuel tank joint of claim 7, wherein the sealant dam extends between the first subset of fasteners and the second subset of fasteners such that the first subset of fasteners each extend through the first zone of sealant and the second subset of fasteners each extend through the second zone of sealant.

9. The aircraft fuel tank joint of claim 7, wherein the first subset of fasteners each comprises a first boundary-facing region that faces the first boundary of the gap and the second subset of the plurality of fasteners each comprises a second boundary-facing region that faces the second boundary of the gap, and wherein the sealant dam is formed in a pattern that extends outside of the first boundary-facing region of at least some of the first subset of fasteners and outside of the second boundary-facing region of at least some of the second subset of fasteners.

10. The aircraft fuel tank joint of claim 1, wherein the sealant dam mechanically isolates the first zone of sealant from the second zone of sealant and is configured to prevent mechanical failure from propagating between the first zone of sealant and the second zone of sealant.

11. The aircraft fuel tank joint of claim 1, wherein the sealant dam comprises a material composition that is different from a sealant material composition of any sealant zone of the plurality of sealant zones.

12. An aircraft wing box, comprising:
an upper skin;
a lower skin;
a leading spar;
a trailing spar spaced aft of the leading spar;
wherein the leading spar and the trailing spar support the upper skin and the lower skin spaced from one another to define an internal volume between the leading spar, the trailing spar, the upper skin, and the lower skin; and
the aircraft fuel tank joint of claim 1, wherein the first structural member is one of the upper skin and the lower skin, and wherein the second structural member is one of the leading spar and the trailing spar.

13. The aircraft wing box of claim 12, wherein the aircraft wing box comprises a plurality of aircraft fuel tank joints, wherein each aircraft fuel tank joint of the plurality of aircraft fuel tank joints is the aircraft fuel tank joint, wherein the plurality of aircraft fuel tank joints comprises a first aircraft fuel tank joint formed between the upper skin and the leading spar, a second aircraft fuel tank joint formed between the upper skin and the trailing spar, a third aircraft fuel tank joint formed between the lower skin and the leading spar, and a fourth aircraft fuel tank joint formed between the lower skin and the trailing spar.

14. A method of assembling an aircraft fuel tank joint having a length, the method comprising:
substantially filling a gap between a first joint face of a first structural member of the aircraft fuel tank joint and a second joint face of a second structural member of the aircraft fuel tank joint with a sealant dam and a plurality of sealant zones, wherein the plurality of sealant zones comprises a first zone of sealant on a first side of the sealant dam and a second zone of sealant on a second side of the sealant dam; and
compressing the sealant dam between the first joint face and the second joint face to a compressed thickness.

15. The method of claim 14, wherein the substantially filling comprises applying the sealant dam to one of the first joint face and the second joint face along a substantial portion of the length of the aircraft fuel tank joint, and wherein the substantially filling further comprises applying sealant to the one of the first joint face and the second joint face along the substantial portion of the length of the aircraft fuel tank joint.

16. The method of claim 15, wherein the applying sealant comprises applying sealant to the one of the first joint face and the second joint face on the first side of the sealant dam and on the second side of the sealant dam.

17. The method of claim 16, wherein the sealant dam comprises a nominal thickness prior to the compressing that is greater than the compressed thickness, and wherein the applying sealant comprises applying sealant on the one of the first joint face and the second joint face to a thickness of sealant on the one of the first joint face and the second joint face that is substantially the same as the nominal thickness of the sealant dam.

18. The method of claim 14, wherein the compressing comprises applying a preselected compressive force between the first structural member and the second structural member, wherein the sealant dam comprises a nominal thickness prior to the compressing, and wherein the preselected compressive force corresponds to a compressive force that is needed to compress the sealant dam from the nominal thickness to the compressed thickness.

19. The method of claim 18, further comprising installing a plurality of fasteners in the aircraft fuel tank joint, wherein the plurality of fasteners extend transverse to the length of the aircraft fuel tank joint and through the first structural member, the gap, and the second structural member, wherein the compressing comprises applying a preselected torque to each of the plurality of fasteners such that the plurality of fasteners apply the preselected compressive force between the first structural member and the second structural member.

20. The method of claim 14, further comprising curing sealant in the plurality of sealant zones within the gap, wherein the curing the plurality is performed subsequent to the compressing, and wherein sealant in the plurality of sealant zones is uncured prior to the compressing.

* * * * *